(12) United States Patent
Kocurek et al.

(10) Patent No.: US 8,800,648 B2
(45) Date of Patent: Aug. 12, 2014

(54) SEAL HAVING STRESS CONTROL GROOVE

(75) Inventors: Christopher George Kocurek, Houston, TX (US); Daniel Ryan Quates, Houston, TX (US)

(73) Assignee: Cameron International Corporation, Houston, TX (US)

( * ) Notice: Subject to any disclaimer, the term of this patent is extended or adjusted under 35 U.S.C. 154(b) by 336 days.

(21) Appl. No.: 13/127,034

(22) PCT Filed: Jan. 11, 2010

(86) PCT No.: PCT/US2010/020679
§ 371 (c)(1), (2), (4) Date: Apr. 29, 2011

(87) PCT Pub. No.: WO2010/083132
PCT Pub. Date: Jul. 22, 2010

(65) Prior Publication Data
US 2011/0266752 A1    Nov. 3, 2011

Related U.S. Application Data

(60) Provisional application No. 61/145,730, filed on Jan. 19, 2009.

(51) Int. Cl.
*E21B 33/03* (2006.01)

(52) U.S. Cl.
USPC .......................................... 166/179; 166/196

(58) Field of Classification Search
USPC .......................................... 166/387, 179, 196
See application file for complete search history.

(56) References Cited

U.S. PATENT DOCUMENTS

| | | | |
|---|---|---|---|
| 3,007,723 A | 11/1961 | Clarke | |
| 3,288,475 A | 11/1966 | Benoit | |
| 3,454,088 A * | 7/1969 | Gibbs et al. | 166/124 |
| 3,940,155 A | 2/1976 | Baumle | |
| 5,096,209 A | 3/1992 | Ross | |
| 5,180,008 A | 1/1993 | Aldridge et al. | |
| 5,330,201 A | 7/1994 | Hart | |

(Continued)

FOREIGN PATENT DOCUMENTS

| | | |
|---|---|---|
| EP | 0334389 A2 | 9/1989 |
| FR | 2704042 | 10/1994 |
| GB | 1224219 | 3/1971 |

OTHER PUBLICATIONS

Singapore Examination Report for Singapore Application No. 201104212-4 mailed on Jul. 11, 2012.
PCT Search Report and Written Opinion for PCT/US2010/020679 mailed Apr. 22, 2010.

(Continued)

*Primary Examiner* — William P Neuder
(74) *Attorney, Agent, or Firm* — Fletcher Yoder, P.C.

(57) ABSTRACT

A seal, in certain embodiments, includes a seal body having a groove on a face of the seal body. The face is configured to contact a surface of a separate component to form a seal. The groove interrupts continuity of the face between a first face portion and a second face portion. In addition, the groove enables material deformation laterally between the first face portion and the second face portion. Furthermore, the groove increases contact stress at corners between opposite walls of the groove and the respective first and second face portions.

20 Claims, 8 Drawing Sheets (56) References Cited

U.S. PATENT DOCUMENTS

| | | | |
|---|---|---|---|
| 5,791,657 | A | 8/1998 | Cain et al. |
| 5,873,576 | A | 2/1999 | Dietle et al. |
| 6,173,964 | B1 | 1/2001 | Bell et al. |
| 6,565,093 | B2 | 5/2003 | Crow et al. |
| 7,976,075 | B2 | 7/2011 | Smith, III et al. |
| 8,201,832 | B2 | 6/2012 | Kocurek |
| 2002/0084593 | A1 | 7/2002 | Baehl et al. |
| 2002/0121743 | A1 | 9/2002 | Crow et al. |
| 2007/0029080 | A1 | 2/2007 | Moyes |
| 2010/0181729 | A1 | 7/2010 | Slay et al. |
| 2010/0194049 | A1 | 8/2010 | Kocurek |
| 2010/0206588 | A1 | 8/2010 | Nguyen |
| 2011/0266752 | A1 | 11/2011 | Kocurek et al. |
| 2012/0205873 | A1 | 8/2012 | Turley |
| 2012/0227957 | A1* | 9/2012 | Xu et al. .................. 166/118 |
| 2012/0298376 | A1 | 11/2012 | Twardowski |

OTHER PUBLICATIONS

Bauer et al.; "Dichtungen fur die Fluidtechnik"; Jan. 1, 1993; Dichtungen Fuer Die Fluidtechnik, Mainz; Vereinigte Fachverl, pp. 154-162; XP002507429; ISBN: 9783783002768; figures 1.7.22b, 1.7.22f, g.

PCT International Preliminary Report on Patentability for PCT/US2010/020679, mailed on Jul. 28, 2011.

Parker Hannifin Corporation, Engineered Polymer Systems Division, "S-Seal Profile for HTHP Sealing," Technical Bulletin, No. 5277B1/USA, Salt Lake City, UT, 2005, 4 pages.

Parker Hannifin Corporation, Engineered Polymer Systems Division, "S-Seal Profile for HTHP Sealing," Technical Bulletin, No. 5277B1/USA, Salt Lake City, UT, 2006, 4 pages.

PCT International Search Report and Written Opinion for PCT/US2012/050782, dated Feb. 1, 2013.

* cited by examiner

SEAL HAVING STRESS CONTROL GROOVE

CROSS-REFERENCE TO RELATED APPLICATIONS

This application claims priority to and benefit of PCT Patent Application No. PCT/US2010/020679, entitled "Seal Having Stress Control Groove," filed Jan. 11, 2010, which is herein incorporated by reference in its entirety, and which claims priority to and benefit of U.S. Provisional Patent Application No. 61/145,730, entitled "Seal Having Stress Control Groove", filed on Jan. 19, 2009, which is herein incorporated by reference in its entirety.

FIELD OF THE INVENTION

This present invention relates to seals within a fluid system. More particularly, the present invention relates to grooved seals suitable for use in the harsh environments encountered by mineral extraction systems, for example.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Fluid systems, such as mineral (e.g., oil and gas) extraction systems and transport systems, typically include multiple segments of tubing, valves, and connectors that are sealed together by various seals. These seals are often subjected to harsh environmental conditions, such as exposure to corrosive fluids, extreme pressures, and extreme temperatures. Moreover, seals are often disposed in remote equipment, such as a marine (e.g., sub-sea) wellhead, which can make access and repair of the seal difficult and expensive. In mineral extraction applications, seals are often constructed of elastomers or rubbers. These seals frequently experience large temperature variances. Over time, due primarily to this temperature gradient, these seals are damaged in that they tend to lose their memory or shape. When this type of damage occurs, the seals are less effective at high pressures and sub-ambient temperatures.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Figure 1:
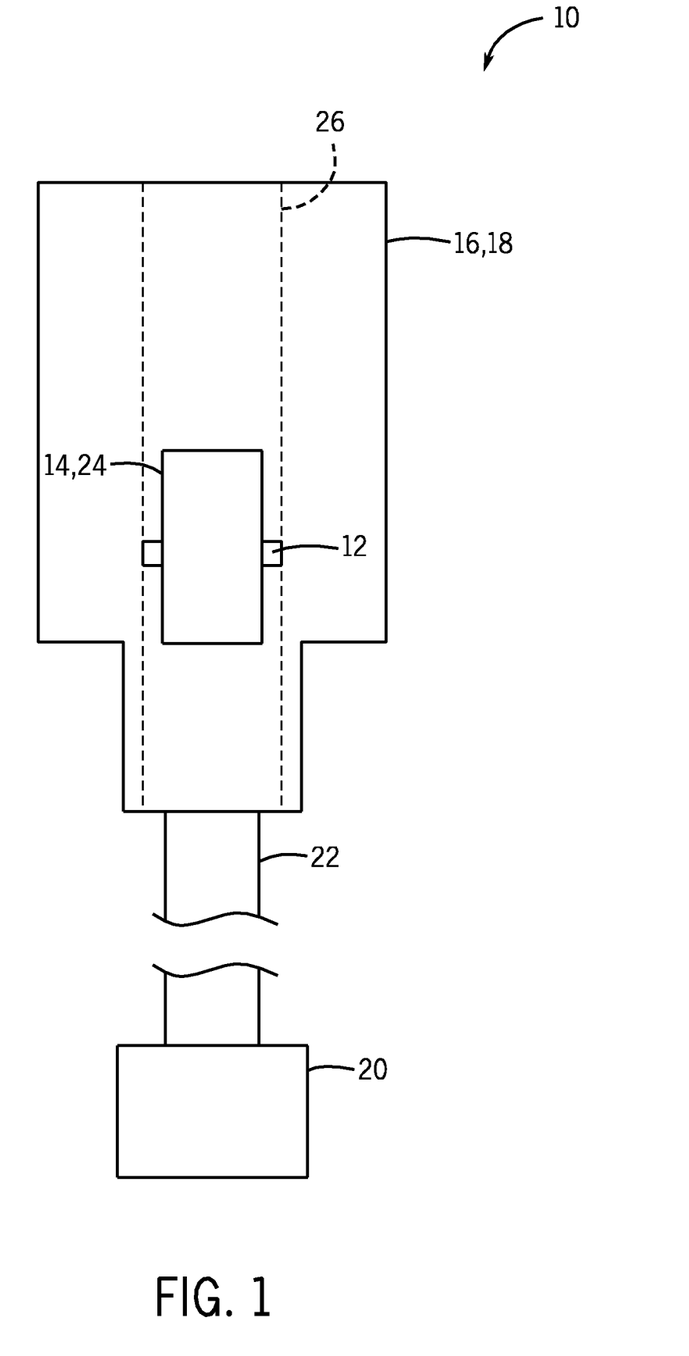
FIG. 1 is a block diagram of a seal disposed in a fluid system, in accordance with embodiments of the present technique.

FIG. 1 is a partial cross-sectional view of an embodiment of a fluid system 10 having one or more seals 12 between an inner body 14 and an outer body 16. In certain embodiments, the fluid system 10 includes a mineral extraction system for the extraction of subterranean natural resources, such as oil and gas. For example, in the illustrated embodiment, the outer body 16 includes a wellhead 18 coupled to a mineral deposit 20 via a well 22. The inner body 14 includes a hanger 24 disposed in a wellhead bore 26 and supported by the wellhead 18, for example. In the case of mineral extraction systems, the inner body 14 and the outer body 16 may include or be coupled to any number of components, such as christmas trees, casing hangers, casing heads, casing strings, tubing hangers, tubing heads, tubing strings, running tools, blowout preventers, valves, flanges, and so forth. In mineral extraction and similar systems, the seal 12 may be used with working pressures up to 20,000 pounds per square inch (psi). In certain embodiments, the seal 12 may be used to isolate regions of gases or fluids with pressure differentials across the seal 12 of 15,000 psi or greater. Further, the operating environment of such systems may include temperatures ranging from −50° F. to 400° F.

Certain exemplary grooved seal embodiments described herein include systems and methods which address one or more of the above-mentioned challenges of operating a seal 12 in harsh sub-sea environmental conditions, such as exposure to corrosive fluids, extreme pressures, and extreme temperatures. As explained in greater detail below, the disclosed embodiments include a seal 12 having a cross-section which includes grooves on inner and/or outer faces of the seal, which contact the inner or outer bodies 14, 16 to form fluid seals. The grooves may function to create higher contact stresses near the grooves and may force the material used for the body of the seal 12 to slightly deform into a cavity formed by the groove, thereby more effectively sealing between the inner and outer bodies 14, 16 and the grooved seal 12.

In addition, the grooved seal 12 embodiments described herein may be capable of operation across a broader spectrum of temperatures and pressures. As described above, the environments within which sub-sea seals operate are frequently transitioned between hot and cold temperature cycles. Tests have shown that typical sub-sea seals are generally only capable of maintaining 12,500 psi while cycling between approximately 35° F. and approximately 285° F. However, tests have shown that the grooved seals 12 described herein may be capable of maintaining 15,000 psi while cycling between approximately 20° F. and approximately 375° F. Therefore, the grooved seal 12 embodiments described herein may maintain greater pressure than typical seals across a wider range of temperatures than typical seals. In addition, it is estimated that the grooved seal embodiments described herein may be capable of maintaining 10,000 psi while cycling between approximately 10° F. and approximately 400° F. and maintaining 20,000 psi while cycling between approximately 35° F. and approximately 350° F.

Figure 2:
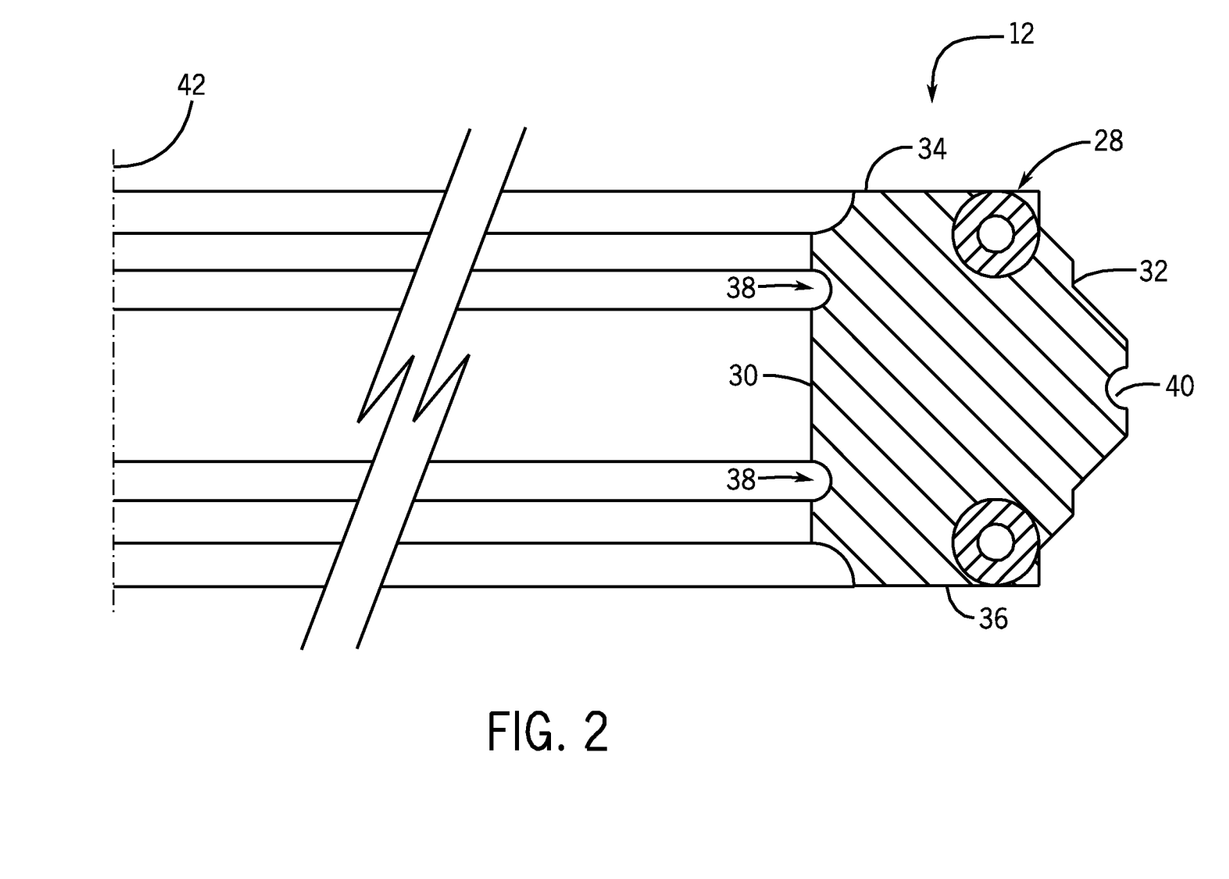
FIG. 2 is a partial cross-section of an exemplary embodiment of the grooved seal.

FIG. 2 illustrates a cross-sectional view of an exemplary embodiment of the grooved seal 12. The illustrated embodiment includes the annular grooved seal 12 having a body 28, an inner face 30, an outer face 32, a top face 34, a bottom face 36, one or more inner grooves 38 on the inner face 30, one or more outer grooves 40 on the outer face 32, and a longitudinal axis 42. The body 28 of the annular (e.g., radial) grooved seal 12 includes a ring-like member centered about the longitudinal axis 42. The inner face 30 includes the innermost diameter of the body 28, which generally interfaces with (e.g., contacts) the inner body 14. The outer face 32 includes the face of the grooved seal 12 on the outermost diameter of the body 28, which generally interfaces with (e.g., contacts) the outer body 16. Accordingly, the inner face 30 and the outer face 32 may provide a fluid seal between the annular grooved seal 12 and the inner body 14 and the outer body 16, respectively.

In an annular seal configuration, the grooved seal 12 is generally set by a radial load, which compresses or expands the seal into contact with complementary sealing surfaces (e.g., the inner body 14 and the outer body 16). For example, the inner body 14 may include a section with a smaller diameter, a section with a larger diameter, and a tapered section between the two sections. As such, the inner body 14 may urge the grooved seal 12 onto the inner body 14 and over the tapered section from the small diameter section to the large diameter section. This may provide an axial load, which biases the grooved seal 12 outward and compresses the grooved seal 12 against the outer body 16. Similarly, a taper on the outer body 16 may provide a compressive load on a grooved seal 12 to generate an inward radial loading, which compresses the grooved seal 12 against the inner body 14.

In general, the top face 34 and the bottom face 36 generally do not seal with a complementary surface. However, in a packer arrangement, the top face 34 and the bottom face 36 may generally be used as locations to apply loads to seat, set, and/or lock the grooved seal 12 in place. In other words, the top face 34 and the bottom face 36 may experience axial loads to push the grooved seal 12 into position, to compress the grooved seal 12 such that it expands radially between the inner body 14 and the outer body 16, and to hold the grooved seal 12 in place. For example, a tool may be forced against the top face 34 until the bottom face 36 contacts a surface and/or another tool. Therefore, the top face 34 may be loaded in a direction parallel to the longitudinal axis 42 to compress the grooved seal 12, causing the grooved seal 12 to expand radially. The radial expansion may cause the inner face 30 and the outer face 32 to bias against the inner body 14 and the outer body 16, respectively, forming a fluidic seal between the respective interfaces. Continuing to apply the axial force (e.g., locking the grooved seal 12) may maintain the radial expansion and, thus, maintain the fluid seal.

Figure 3A:
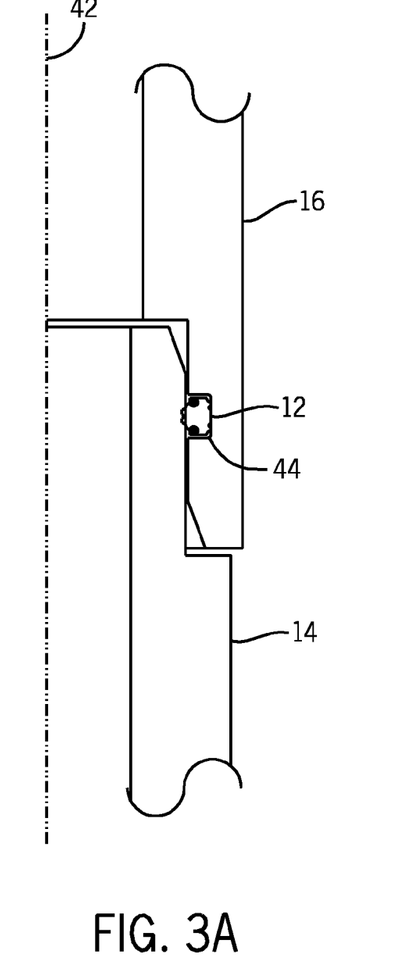
FIGS. 3A and 3B are cross-sectional views of exemplary embodiments of an inner body and an outer body, within which the grooved seal may be oriented.
Figure 3B:
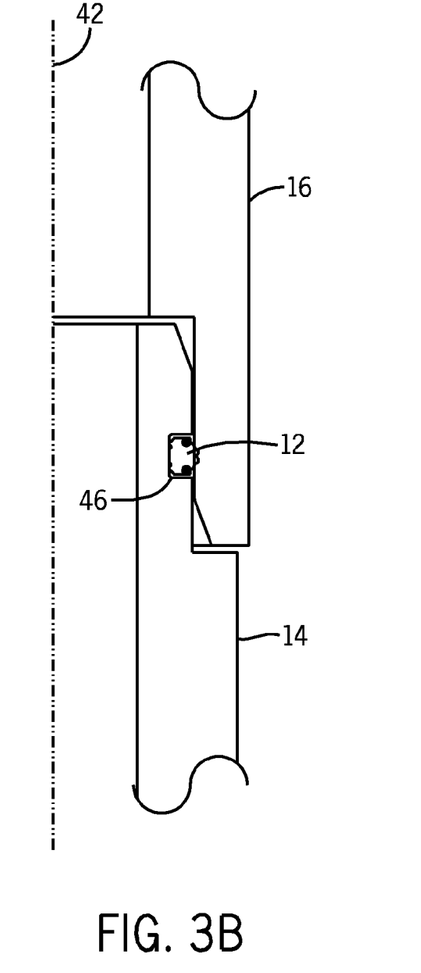

The body 28 of the grooved seal 12 may be oriented in various configurations between the inner body 14 and the outer body 16. For example, FIGS. 3A and 3B are cross-sectional views of exemplary embodiments of an inner body 14 and an outer body 16, within which the grooved seal 12 may be oriented. For instance, in FIG. 3A, the grooved seal 12 is located within an outer body recess 44 of the outer body 16. In addition, as illustrated, the grooved seal 12 of FIG. 3A, illustrated as a spring seal, is oriented in such a way that the side of the grooved seal 12 that includes the anti-extrusion springs is closest to the innermost diameter of the grooved seal 12. Conversely, in FIG. 3B, the grooved seal 12 is located within an inner body recess 46 of the inner body 14. In addition, as illustrated, the grooved seal 12 of FIG. 3B, again illustrated as a spring seal, is oriented in such a way that the side of the grooved seal 12 which includes the anti-extrusion springs is the outermost diameter of the grooved seal 12. Therefore, the grooved seal 12 may be located within recesses of either the inner body 14 or the outer body 16 and may be oriented in various ways within these recesses. In other words, the location and orientation of the grooved seal 12 may vary.

Returning now to FIG. 2, the portion of the grooved seal 12 (e.g., the seal interface) that engages the complementary surfaces (e.g., the inner body 14 and the outer body 16) may include a variety of shapes and configurations. For example, the seal interface may include a continuous surface that is formed from one or more materials. In an embodiment wherein the complementary sealing surface generally conforms to the contour of the grooved seal 12 (e.g., a relatively flat surface), the sealing interface may include a single engagement portion that extends across a surface of the grooved seal 12. In an embodiment where the complementary surface includes a surface that does not conform to a surface of the grooved seal 12 (e.g., an interrupted surface), the seal interface may include one or more engagement portions at each location where the grooved seal 12 contacts the complementary surface. Further, the grooved seal 12 may include a plurality of interruptions along its sealing surface. For example, the grooved seal 12 may include one or more bumps, protrusions, indentations, recesses, or similar features. Accordingly, where the complementary surface does not conform to the contour of the grooved seal 12, the seal interface may include one or more engagement portions at each of the locations where the grooved seal 12 contacts the complementary surface. Further, each of the seal engagement portions may include the same or even different types of materials, depending on the composition and arrangement of the materials used to form the grooved seal 12.

The body 28 of the grooved seal 12 may be characterized as hard and/or soft by a variety of metrics. In one embodiment, the hardness of the body 28 may be characterized by the resistance to indentation, otherwise referred to as the materials Durometer (D) denoted in the Shore A scale. In another embodiment, the body 28 may be characterized as hard or soft based on its stiffness (e.g., glass transitions temperature). In a characterization including the Durometer, materials are generally characterized based on ranges. Hard elastomers generally include those having a Durometer greater than about 80 Shore A, soft elastomers generally include those having a Durometer of about 60 Shore A to about 80 Shore A, and super-soft elastomers generally include those having a Durometer below about 60 Shore A.

In certain embodiments, the body 28 of the grooved seal 12 includes a hydrogenated nitrile butadiene rubber (HNBR) having a Durometer of about 90 Shore A. In other embodiments, the body 28 includes a nitrile rubber (NBR) having a Durometer of about 70 Shore A. Further, certain embodiments may include the body 28 formed from a CAMLAST™ or a DUROCAM™ material, manufactured by Cameron with headquarters in Houston, Tex. In addition, certain embodiments may include the body 28 formed from an Elast-O-Lion® material (e.g., Elast-O-Lion® 101 or Elast-O-Lion® 985), manufactured by the James Walker Group with headquarters in Cheshire, United Kingdom. In general, any other elastomer or rubber (e.g., Viton, EPDM, and so forth) suitable for use in sub-sea seal applications may be used for the body 28 of the grooved seal 12. In particular, rubbers and elastomers having a Durometer between 70 Shore A and 90 Shore A may be particularly well-suited. However, rubbers and elastomers having a Durometer between 60 Shore A and 100 Shore A may also be used.

Figure 4A:
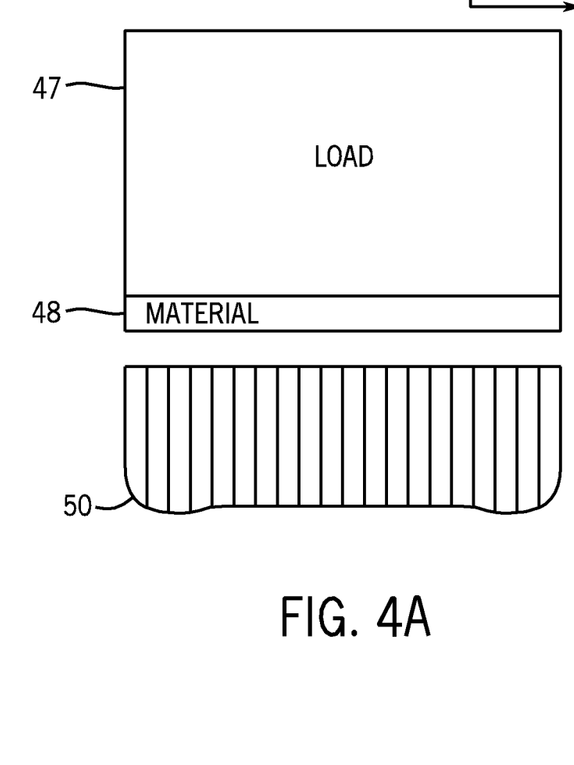
FIGS. 4A and 4B illustrate the loads and contact stress concentrations that may be exerted on exemplary embodiments of the grooved seal.
Figure 4B:
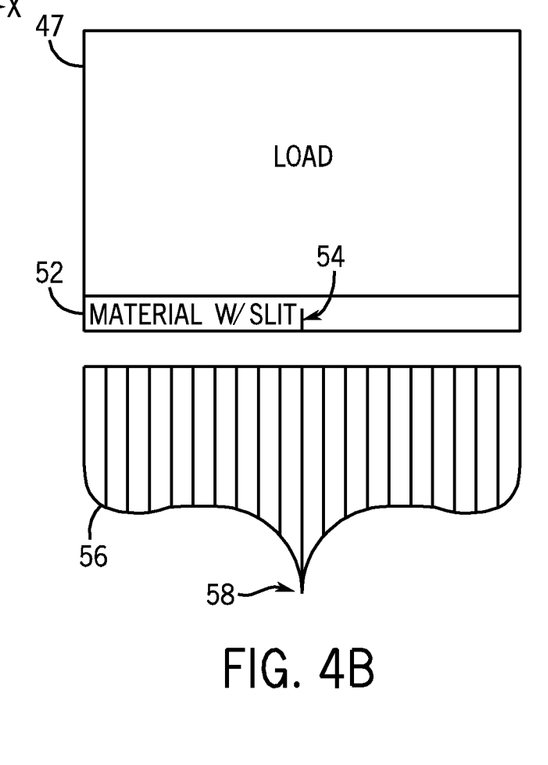

In order to more fully discuss the grooved seal 12 embodiments described herein, the mechanics underlying the grooved seal 12 embodiments will now be presented. In particular, FIGS. 4A and 4B illustrate the loads and contact stress concentrations that may be exerted on exemplary embodiments of the grooved seal 12. Specifically, FIG. 4A illustrates how a load 47 may be applied to a first sheet of material 48, such as rubber. For illustration purposes, the load 47 is depicted as a uniform load 47 applied to a uniform sheet of material 48. However, the mechanics presented herein may also generally apply to less uniform configurations. The load 47 is analogous to the type of load which may be exerted on, for instance, the inner face 30 of the grooved seal 12 from the inner body 14 of FIGS. 2, 3A, and 3B. However, the load 47 may also be analogous to the type of load which may be exerted on, for instance, the outer face 32 of the grooved seal 12 from the outer body 16 of FIGS. 2, 3A, and 3B. In the scenario where the load 47 is uniformly distributed across a uniformly-distributed sheet of material 48 (i.e., without grooves or protrusions), the contact stress concentration 50 across the first sheet of material 48 may also be relatively uniform. Indeed, the contact stress may be approximately equal to:

$$\sigma_{uniform} = \frac{F}{A}$$

where $\sigma_{uniform}$ is the contact stress, F is the force applied by the load 47, and A is the cross-sectional area of the first sheet of material 48, upon which the load 47 is applied.

Conversely, FIG. 4B illustrates the same load 47 applied to a second sheet of material 52. As with the first sheet of material 48, the second sheet of material 52 is also uniformly distributed. However, the second sheet of material 52 includes a slit 54 having an infinitesimal width. In this scenario, as illustrated, the contact stress concentration 56 across the second sheet of material 52 will not be uniform, despite the relatively uniform load 47 and uniform cross-section of the second sheet of material 52. Rather, the contact stress concentration 56 across the second sheet of material 52 will be greater at contact stress point 58, corresponding to the location of the slit 54 along the bottom face of the second sheet of material 52. Indeed, the contact stress at point 58 will be greater than $\sigma_{uniform}$, corresponding to the uniform contact stress concentration illustrated in FIG. 4A. However, it should be noted that the integral area of both of the contact stress concentration 50, 56 profiles will be the same for both sheets of material 48, 52.

In particular, the contact stress in the y-direction is greater at the slit 54 due, at least in part, to the fact that the second sheet of material 52 is not supported in the x-direction and the z-direction (e.g., into and out of the page) at the slit 54. In other words, the material that was resisting movement in both the x-direction and the z-direction in FIG. 4A is allowed to move, even if very slightly, in the x-direction and the z-direction in FIG. 4B. In addition, in the context of the grooved seal 12 embodiments, the material of the body 28 of the grooved seal 12 may slightly deform into the cavity formed by the grooves, further creating a tighter seal. These mechanics may prove beneficial in that higher contact stresses at points corresponding to the grooves may enable the grooved seal 12 to create tighter seals and to maintain the shape memory of the grooved seal 12 over a greater range of operating temperatures and pressures.

However, the contact stress at the slit 54 would approach an infinitely large value if the slit 54 had an infinitesimal width. Infinitely large stresses at individual points may counteract the beneficial mechanics described above. Therefore, as a practical matter, the slit 54 illustrated in FIG. 4B may be replaced by grooves having more pronounced cross-sectional areas, as described in greater detail below. Using grooves may considerably reduce the stresses as compared to those experienced by the slit of FIG. 4B while still allowing for the benefits described above. In addition, the use of grooves may prevent crack propagation, which would be more likely when using slits.

Therefore, embodiments of the grooved seal 12 include cross-sections having one or more grooves. In certain embodiments, the grooves may be located along the inner face 30 and/or the outer face 32 of the body 28 of the grooved seal 12. However, in other embodiments, the grooves may be located along the top face 34 and/or the bottom face 36 of the body 28 of the grooved seal 12. The grooves effectively create ridges that provide areas of increased contact stress to maintain a fluid seal between the grooved seal 12 and the internal and external bodies 14, 16. In particular, the point at which the grooves adjoin its respective face of the body 28 of the grooved seal 12 may experience increased contact stress. In addition, the overall contact area may be reduced between, for instance, the inner face 30 of the body 28 of the grooved seal 12 and the inner body 14, further increasing the contact stress. It should be noted that the grooves do not mate with any other mechanical features of the inner and outer bodies 14, 16, such as mating protrusions. Rather, a cavity is formed between each groove and the inner or outer body 14, 16 adjacent to the respective groove. Indeed, the material of the body 28 of the grooved seal 12 may slightly deform into the cavity formed by the grooves.

Figure 5:
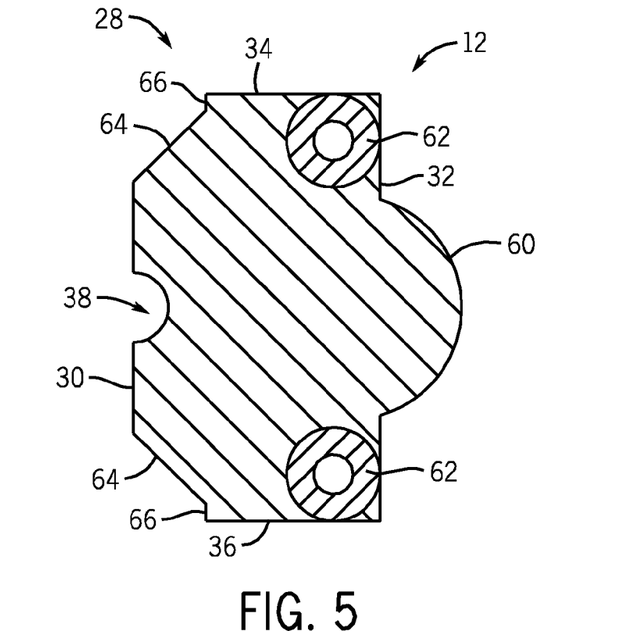
FIG. 5 is a partial cross-section of an exemplary embodiment of an S-seal with an inner groove on its inner face.
Figure 6:
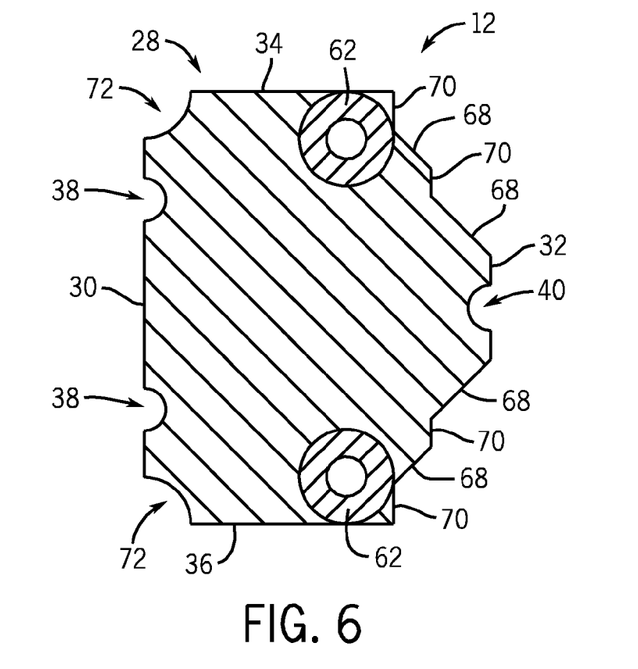
FIG. 6 is a partial cross-section of an exemplary embodiment of an S-seal with multiple inner grooves on its inner face and an outer groove on its outer face.
Figure 7:
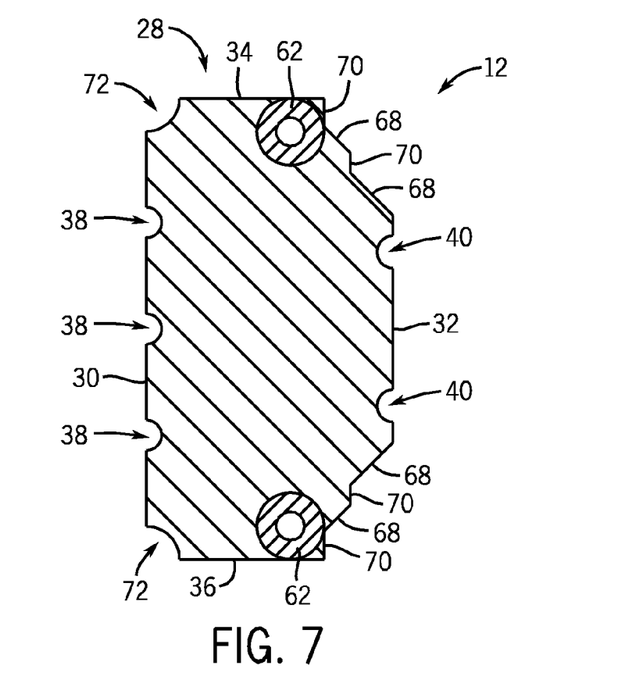
FIG. 7 is a partial cross-section of an exemplary embodiment of an S-seal with multiple inner grooves on its inner face and multiple outer grooves on its outer face.

Turning now to FIGS. 5-7, various embodiments of the grooved seal 12 are illustrated as an S-seal. However, as described in greater detail below, embodiments of the grooved seal 12 may include other configurations and geometries. FIG. 5 is a partial cross-section of an exemplary embodiment of an S-seal 12 with an inner groove 38 on its inner face 30. The S-Seal 12 includes a curved protrusion 60 from the outer face 32 of the body 28 of the S-seal 12. The protrusion 60 may be the portion of the body 28 of the S-seal 12 which contacts the outer body 16. The S-seal 12 also includes integral anti-extrusion springs 62 near the corners of the outer face 32 of the body 28 of the S-seal 12. The anti-extrusion springs 62 may, for instance, be made of metal, PEEK (polyetheretherketone), or other suitable hard materials.

In addition, the inner face 30 of the body 28 of the S-seal 12 includes tapered notches 64 extending from the inner face 30 to lips 66, which adjoin the top face 34 and the bottom face 36 of the body 28 of the S-seal 12, respectively. The tapered notches 64 may reduce the contact area between the body 28 of the S-seal 12 and the inner body 14, with which the inner face 30 of the body 28 of the S-seal 12 contact. Additionally, the inner face 30 of the body 28 of the S-seal 12 includes an inner groove 38 which, as discussed in greater detail above, may help create higher contacts stresses along the inner face 30 as well as enable the body 28 of the S-seal 12 to slightly deform into the cavity formed by the inner groove 38. As such, the effectiveness of the fluid sealing characteristics of the S-seal 12 may be enhanced for a broader range of operating temperatures and pressures.

Although illustrated in FIG. 5 as a full-radius groove, the inner groove 38, and indeed all of the grooves described herein, need not be limited to a full-radius design. For instance, the grooves may be half-radius, rectangular, triangular, and so forth. In addition, in certain embodiments, the grooves may be wider, thinner, deeper, shallower, and so forth. Indeed, no particular groove cross-section is required. However, tests have shown that a full-radius groove, in many circumstances, may provide particularly good sealing performance across a broader range of temperatures.

In addition, it should be noted that an important consideration is that the grooves not be too wide or deep, since a general purpose of the grooves is to minimally interrupt the sealing surface while still utilizing the radial "spring" energy of the seal. In contrast, if the grooves are too wide or too deep, the amount of radial energy stored in the seal may decrease, thereby decreasing the effectiveness of the seal. As such, the grooves may generally be designed such that the width and depth of the grooves are only a fraction (e.g., 2%, 5%, 8%, 10%, and so forth) of the sealing surface within which the grooves are located.

In addition, tests have shown that another important design factor may be the use of 90° angles between the inner face 30 and the inner wall of the inner groove 38 (i.e., the inner wall of the inner groove 38 and the inner face 30 are perpendicular). Furthermore, tests have shown that the grooves may be most effective with radii of 0.020-inch. However, other radii values, such as 0.005-inch increments between 0.015-inch and 0.060-inch, may also be used. All of these considerations also hold true for grooves on the outer face 32 as well as for all of the grooves described herein.

FIG. 6 is a partial cross-section of an exemplary embodiment of an S-seal 12 with multiple inner grooves 38 on its inner face 30 and an outer groove 40 on its outer face 32. Instead of the curved protrusion 60 illustrated in FIG. 5, the S-seal 12 of FIG. 6 includes multiple tapered lead-ins 68 and associated lips 70 on the outer face 32 of the body 28 of the S-seal 12. In addition, the outer face 32 of the body 28 of the S-seal 12 includes the outer groove 40. The outer groove 40 may function similarly to the inner groove 38 of FIG. 5, creating higher contact stresses along the outer face 32 and allowing for the body 28 of the S-seal 12 to slightly deform into the cavity formed by the outer groove 40.

Additionally, as opposed to the embodiment illustrated in FIG. 5, the inner face 30 of the body 28 of the S-seal 12 of FIG. 6 includes multiple inner grooves 38. The use of multiple grooves 38 along the inner face 30 may be due to a larger contact area between the inner face 30 and the inner body 14. In other words, the multiple inner grooves 38 may generate multiple points of increased contact stress, as illustrated by point 58 in FIG. 4B. In addition, the inner face 30 of the body 28 of the S-seal 12 of FIG. 6 includes curved notches 72, as opposed to the tapered notches 64 of FIG. 5, at the corners of the inner face 30 which adjoin the top face 34 and the bottom face 36 of the body 28 of the S-seal 12, respectively. As with the tapered notches 64 of FIG. 5, the curved notches 72 of FIG. 6 may reduce the contact area between the body 28 of the S-seal 12 and the inner body 14, with which the inner face 30 of the body 28 of the S-seal 12 contacts.

FIG. 7 is a partial cross-section of an exemplary embodiment of an S-seal 12 with multiple inner grooves 38 on its inner face 30 and multiple outer grooves 40 on its outer face 32. For the most part, the embodiment illustrated in FIG. 7 is very similar to the embodiment illustrated in FIG. 6. However, in this embodiment, both the inner face 30 and the outer face 32 include multiple grooves. Indeed, any number of grooves may be used on any number of faces of the body 28 of the grooved seal 12. In addition, the distance between multiples grooves on a particular face may vary. For instance, multiple grooves may be spaced ¼", ½", 1", 2", and so forth, apart from each other, depending on the specific configuration.

Figure 8:
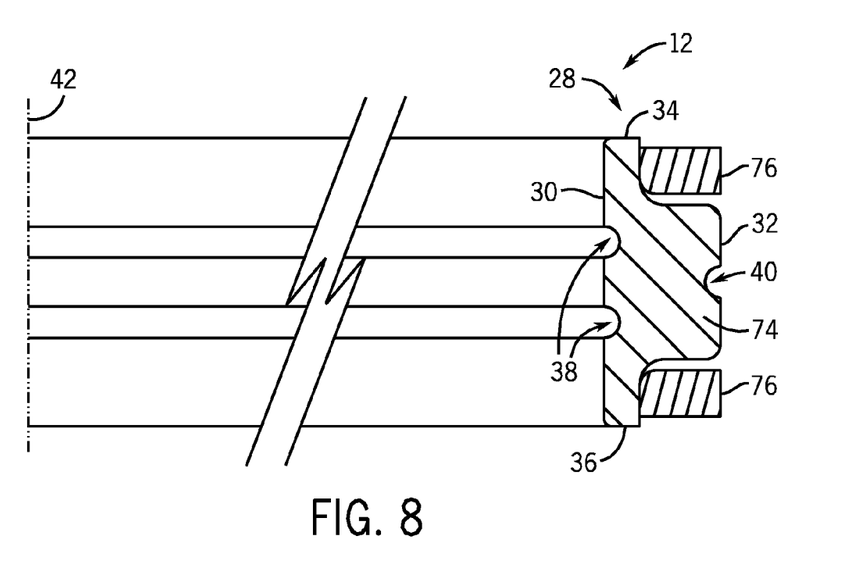
FIG. 8 is a partial cross-section of an exemplary embodiment of a T-seal with multiple inner grooves on its inner face and an outer groove on its outer face.

In addition to the embodiments of the S-seal 12 illustrated in FIGS. 5-7, other embodiments include alternate configurations and geometries. For example, certain embodiments include T-seals, Metal-End-Cap seals, generic annular (e.g., radial) seals, face seals, and so forth. For example, FIG. 8 is a partial cross-section of an exemplary embodiment of a T-seal 12 with multiple inner grooves 38 on its inner face 30 and an outer groove 40 on its outer face 32. The T-seal 12 includes a protrusion 74 from the outer face 32 of the body 28 of the T-seal 12, and extrusion rings 76 disposed integral to the protrusion 74. The extrusion rings 76 may, for instance, be made of metal, PEEK, or other suitable hard materials.

Figure 9:
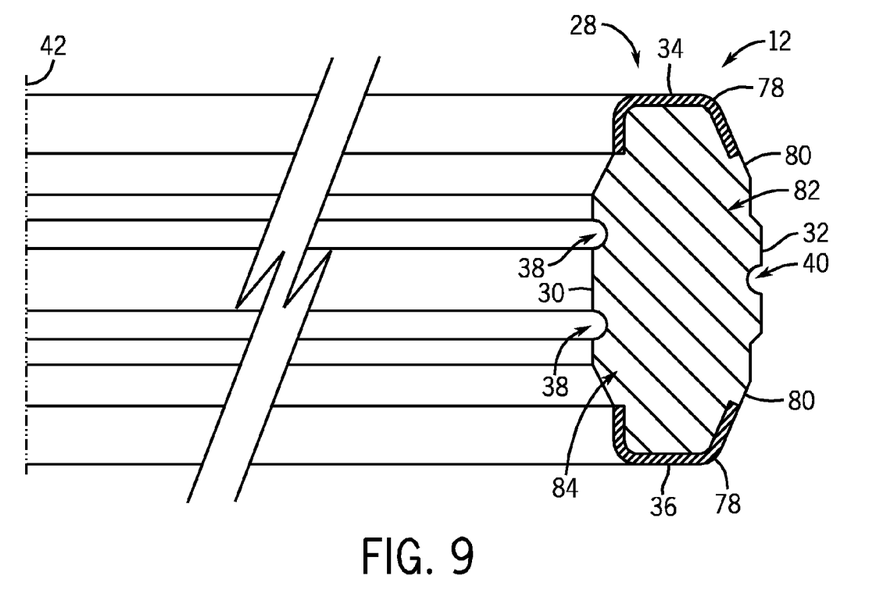
FIG. 9 is a partial cross-section of an exemplary embodiment of a Metal-End-Cap seal with multiple inner grooves on its inner face and an outer groove on its outer face.

In addition, FIG. 9 is a partial cross-section of an exemplary embodiment of a Metal-End-Cap seal 12 with multiple inner grooves 38 on its inner face 30 and an outer groove 40 on its outer face 32. The Metal-End-Cap seal 12 includes metal caps 78 disposed on the top face 34 and bottom face 36 of the Metal-End-Cap seal 12. Further, the Metal-End-Cap seal 12 includes chamfers 80 defining a first protrusion 82 including the outer face 32. The Metal-End-Cap seal 12 also includes a second protrusion 84 that defines the inner face 30. However, in certain embodiments, the Metal-End-Cap seal 12 may have the first protrusion 82 and the chamfers 80 disposed on the inner face 30 of the Metal-End-Cap seal 12 and the second protrusion 84 disposed on the outer face 32.

Figure 10:
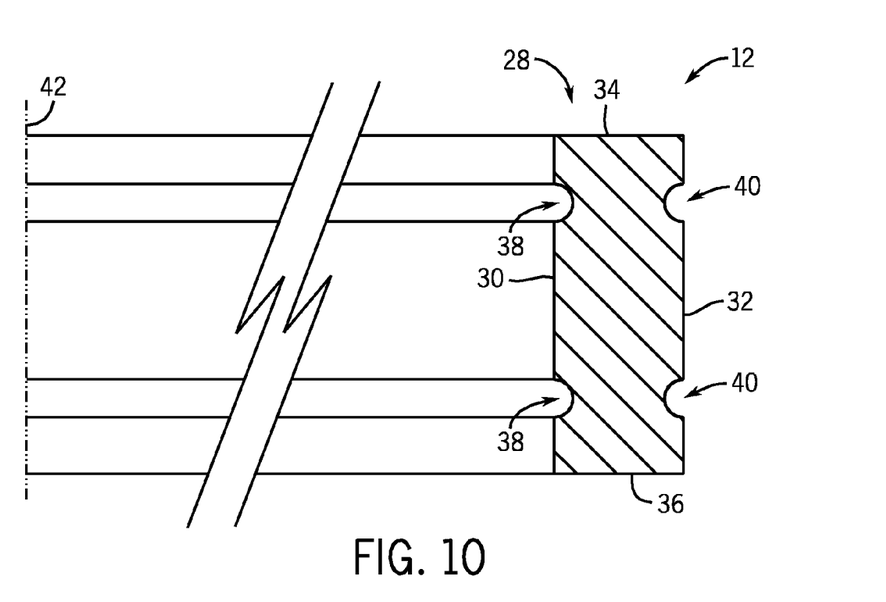
FIG. 10 is a partial cross-section of an exemplary embodiment of a generic annular (radial) seal with multiple inner grooves on its inner face and multiple outer grooves on its outer face.

In addition to the S-seal, T-seal, and Metal-End-Cap seal embodiments illustrated in FIGS. 5-9, the grooved seal 12 may also include more conventional annular (radial) configurations. For instance, FIG. 10 is a partial cross-section of an exemplary embodiment of a generic annular (radial) seal 12 with multiple inner grooves 38 on its inner face 30 and multiple outer grooves 40 on its outer face 32.

Figure 11:
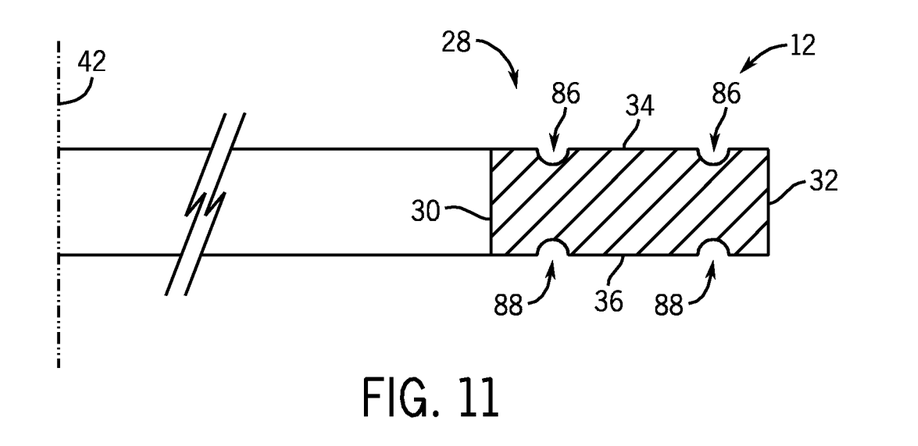
FIG. 11 is a partial cross-section of an exemplary embodiment of a face seal with multiple top grooves on its top face and multiple bottom grooves on its bottom face.

Although the embodiments described above focus primarily on annular (radial) seals 12, similar techniques may be employed in the design and use of face seals. Face seals generally provide a fluid seal between two generally flat surfaces. For example, FIG. 11 is a partial cross-section of an exemplary embodiment of a face seal 12 with multiple top grooves 86 on its top face 34 and multiple bottom grooves 88 on its bottom face 36. In operation, the top face 34 is mated to a first body and the bottom face 36 is mated to a second body to provide a fluid seal between the first and second bodies. Accordingly, this embodiment includes the addition of sealing features conducive to sealing via the top face 34 and the bottom face 36. The distribution of contact stresses through the top grooves 86 and the bottom grooves 88 occurs in generally the same manner with the face seal 12 as with the inner grooves 38 and the outer grooves 40 with the annular (radial) seal embodiments described above.

Each of the above discussed embodiments of the grooved seal 12 may include any combination of elastomers and cross-sections conducive to providing a fluid seal. For example, the grooved seal 12 may include an elastomer having a different hardness, stiffness or glass transition temperature. Further, certain embodiments may include combinations of the embodied cross-sections. For example, an embodiment may include a cross-section including a profile similar to FIG. 5 on the inner face 30, and a cross-section including a profile similar to FIG. 7 on the outer face 32. In other words, the inner face 30 and the outer face 32 profiles may either be symmetrical with one another or asymmetrical with one another. In addition, the number, spacing, and configuration of grooves used on any particular face of the grooved seal 12 may be selected, for instance, based on the length of the interface between the grooved seal 12 and the bodies with which the grooved seal 12 contacts, the expected contact stresses, the expected operating conditions of the well 22, the desired pressure ratings of the grooved seal 12, the annular diameter and width of the grooved seal 12, and so forth.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A seal, comprising:
an annular body having a first material composition comprising a first elastomer, wherein the annular body comprises:
an inner annular face configured to contact and seal against an inner annular body, wherein the inner annular face includes a first inner semi-circular groove about an inner circumference of the annular body; and
an outer annular face is configured to contact and seal against an outer annular body, wherein the outer annular face includes a first outer semi-circular groove about an outer circumference of the annular body, and the first inner and outer semi-circular grooves are configured to increase contact stress and enable material deformation into the first inner and outer semi-circular grooves.

2. The seal of claim 1, wherein the inner annular face comprises first and second inner tapers disposed on opposite sides of the first inner semi-circular groove, and the outer annular face comprises first and second outer tapers disposed on opposite sides of the first outer semi-circular groove.

3. The seal of claim 1, wherein the inner annular face includes a second inner semi-circular groove about the inner circumference of the annular body, and the first outer semi-circular groove is disposed between the first and second inner semi-circular groove.

4. The seal of claim 1, wherein the first inner and outer semi-circular grooves each have a full radius, and opposite side walls of each of the first inner and outer semi-circular grooves are perpendicular to an adjacent seal surface of the inner or outer annular face.

5. A system, comprising:
a first body of a mineral extraction system;
a second body of the mineral extraction system; and
a seal disposed between the first and second bodies of the mineral extraction system, wherein the seal comprises a seal body having a first face and a second face, the first face is configured to contact the first body and the second face is configured to contact the second body, the first face includes a first semi-circular groove that interrupts continuity of the first face between a first face portion and a second face portion, and first opposite side walls of the first semi-circular groove are perpendicular to the first face.

6. The system of claim 5, wherein the first face extends about an axis of the seal body, and the first semi-circular groove extends about a first circumference of the first face.

7. The system of claim 6, wherein the second face extends about the axis of the seal body on an opposite side from the first face, the second face includes a second semi-circular groove extending about a second circumference of the second face, and second opposite side walls of the second semi-circular groove are perpendicular to the second face.

8. The system of claim 7, wherein the second face includes a third semi-circular groove extending about the second circumference of the second face, and third opposite side walls of the third semi-circular groove are perpendicular to the second face.

9. The system of claim 5, wherein the seal body has a material composition comprising hydrogenated nitrile butadiene rubber, nitrile rubber, CAMLAST™, DUROCAM™, Elast-O-Lion® 101, Elast-O-Lion® 985, or a combination thereof.

10. The system of claim 5, wherein the seal has a pressure rating of at least 15,000 pounds per square inch for all temperatures within the range of approximately 20° F. and approximately 375° F.

11. The system of claim 5, wherein the first and second bodies comprise a christmas tree, a casing hanger, a casing head, a casing string, a tubing hanger, a tubing head, a tubing string, a running tool, a blowout preventer, a valve, a well, or a combination thereof.

12. A seal, comprising:
a seal body, comprising:
a first semi-circular groove on a first face of the seal body, wherein the first face is configured to contact a first surface of a first component to form a first seal, and first opposite side walls of the first semi-circular groove are perpendicular to the first face; and
a second semi-circular groove on a second face of the seal body on an opposite side from the first face, wherein the second face is configured to contact a second surface of a second component to form a second seal, and second opposite side walls of the second semi-circular groove are perpendicular to the second face.

13. The seal of claim 12, wherein the first face is a first annular face and the second face is a second annular face, the first semi-circular groove extends circumferentially about the second annular face.

14. The seal of claim 13, comprising a third semi-circular groove extending circumferentially about the second annular face, wherein third opposite side walls of the third semi-circular groove are perpendicular to the second face.

15. The seal of claim 14, wherein the first semi-circular groove is disposed between the second and third semi-circular grooves.

16. The seal of claim 12, wherein the seal body has a material composition comprising hydrogenated nitrile butadiene rubber, nitrile rubber, CAMLAST™, DUROCAM™, Elast-O-Lion® 101, Elast-O-Lion® 985, or a combination thereof.

17. The seal of claim 12, wherein the seal body has a material composition comprising an elastomer having a hardness of greater than 60 Shore A Durometer and less than 100 Shore A Durometer.

18. The seal of claim 12, wherein the seal has a pressure rating of at least 15,000 pounds per square inch for all temperatures within the range of approximately 20° F. and approximately 375° F.

19. The seal of claim 12, wherein the seal has a pressure rating of at least 10,000 pounds per square inch for all temperatures within the range of approximately 10° F. and approximately 400° F.

20. The seal of claim 12, wherein the seal has a pressure rating of at least 20,000 pounds per square inch for all temperatures within the range of approximately 35° F. and approximately 350° F.

* * * * *